(12) United States Patent
Whitt et al.

(10) Patent No.: US 6,587,813 B1
(45) Date of Patent: Jul. 1, 2003

(54) PCI BUS SYSTEM TESTING AND VERIFICATION APPARATUS AND METHOD

(75) Inventors: Jeffrey K. Whitt, Colorado Springs, CO (US); David So, Colorado Springs, CO (US); Stuart Nuffer, Colorado Springs, CO (US); Erik Paulsen, Colorado Springs, CO (US); John Grabarek, Colorado Springs, CO (US); Andrew Hadley, Colorado Springs, CO (US); William Schmitz, Monument, CO (US); Adam Browen, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/546,786

(22) Filed: Apr. 11, 2000

(51) Int. Cl.[7] .................................................. G06F 11/30
(52) U.S. Cl. ..................... 702/186; 702/182; 714/42; 714/726; 714/715; 710/100; 710/110; 710/313; 324/537
(58) Field of Search ................................. 702/127, 186, 702/182; 714/726, 42, 715, 30, 28, 100, 2, 3, 699, 718, 746; 710/100, 110, 306, 260, 313; 711/100, 200, 117, 147; 324/537, 600

(56) References Cited

U.S. PATENT DOCUMENTS 5,930,482 A * 7/1999 Carter et al. ................ 395/280
6,324,663 B1 * 11/2001 Chambers .................... 714/726

* cited by examiner

Primary Examiner—Marc S. Hoff
Assistant Examiner—Elias Desta
(74) Attorney, Agent, or Firm—Suiter-West PC LLO

(57) ABSTRACT

An improved PCI verification method and apparatus provides iterative testing of all desired conditions or protocol combinations in a PCI system. One or more commands may be tested in combination with one or more functional behavior parameters throughout a desired range of variable parameter values. In one aspect, an apparatus and method for testing a PCI device for compliance under the PCI specification in target operation is provided. In another aspect, an apparatus and method for testing a PCI device for compliance under the PCI specification in master operation is provided.

40 Claims, 6 Drawing Sheets

KEY TO

PCI BUS SYSTEM TESTING AND VERIFICATION APPARATUS AND METHOD

FIELD OF THE INVENTION

The present invention relates generally to information handling systems including computer systems and related devices and, more particularly, to a method and apparatus for identifying functional problems in a PCI design via iterative testing of PCI protocol.

BACKGROUND OF THE INVENTION

Once a component of an information handling system has been designed, system designers may need to verify its operation to ensure that it operates as designed and that it interfaces properly with each of the other elements of the system.

In order to verify that each element of a newly designed system functions properly, system verification engineers may create a computer model of the system or components to be tested. Although simulation and design verification software reveal many problems, many designs must undergo lengthy and expensive debug phases before yielding fully operational, full specification parts.

A prior art method of system verification involves the use of exercisers/analyzers. Typically, an exerciser randomly selects operations to be performed or applied to the device under test. The advantage of using exercisers/analyzers is that they tend to provide more complete tests in a shorter time frame. The use of exercisers, however, is not without drawbacks. One problem associated with using random exercisers in a PCI environment is that it is typically a fully automated process with a high level of randomness and thus does not guarantee that a given condition or PCI protocol combination has been tested or that a system has been fully tested. It would, therefore, be desirable to provide an improved PCI verification method and apparatus that can be automated to provide iterative testing of all desired conditions or protocol combinations in a PCI system.

SUMMARY OF THE INVENTION

In one aspect, the present invention provides a method for the automatic testing of a PCI bus system in an information handling system, such as a computer system, comprising the steps of selecting a PCI command to be tested; programming a PCI master to exhibit predetermined functional behavior during a PCI transaction; asserting the PCI command to initiate a PCI transaction, the transaction comprising transfer of data over the PCI bus; transferring at least a portion of the data; monitoring and recording the behavior of the PCI bus system; determining whether a PCI protocol error has occurred; if an error has occurred, logging the error and halting execution; repeating the process until it is determined that an error has occurred or until the PCI transaction is complete; and, if the PCI transaction is completed, writing data from a first memory location to a second memory location, reading data from the second memory location, and comparing data from the first memory location to data from the second memory location. In a further aspect, one or more commands may be tested in combination with one or more functional behavior parameters throughout a desired range of variable parameter values.

In another aspect, the present invention provides a method for the automatic testing of a PCI bus system in an information handling system comprising the steps of initializing a PCI target device, which is programmable to exhibit predetermined functional behavior during a PCI transaction; programming the PCI target device to exhibit the predetermined functional behavior during the PCI transaction; providing a PCI master device, the PCI master device comprising configuration address space, the configuration address space programmable to configure the PCI master device; programming the configuration address space to provide a first set of PCI bus utilization properties for the PCI master device; after the PCI target device is programmed to exhibit the predetermined functional behavior, initiating the PCI transaction, the transaction comprising transfer of data over the PCI bus; transferring at least a portion of the data; monitoring and recording the behavior of the PCI bus system; determining whether a PCI protocol error has occurred; if an error has occurred, logging the error and halting execution; repeating the process until it is determined that an error has occurred or until the PCI transaction is complete; and, if the PCI transaction is complete, writing data from a first memory location to a second memory location, reading data from the second memory location, and comparing data from the first memory location to data from the second memory location. In a further aspect, one or more commands may be tested in combination with one or more functional behavior parameters throughout a desired range of variable parameter values.

It is to be understood that both the foregoing general description and the following detailed description are exemplary and explanatory only and are not restrictive of the invention as claimed. The accompanying drawings, which are incorporated in and constitute a part of the specification, illustrate presently preferred embodiments of the invention, and together with the general description given above and the detailed description of the preferred embodiments given below, serve to explain the principles of the invention.

BRIEF DESCRIPTION OF THE DRAWINGS

The detailed description of the invention may be best understood when read in reference to the accompanying drawings wherein.

DETAILED DESCRIPTION OF THE INVENTION

Figure 1:
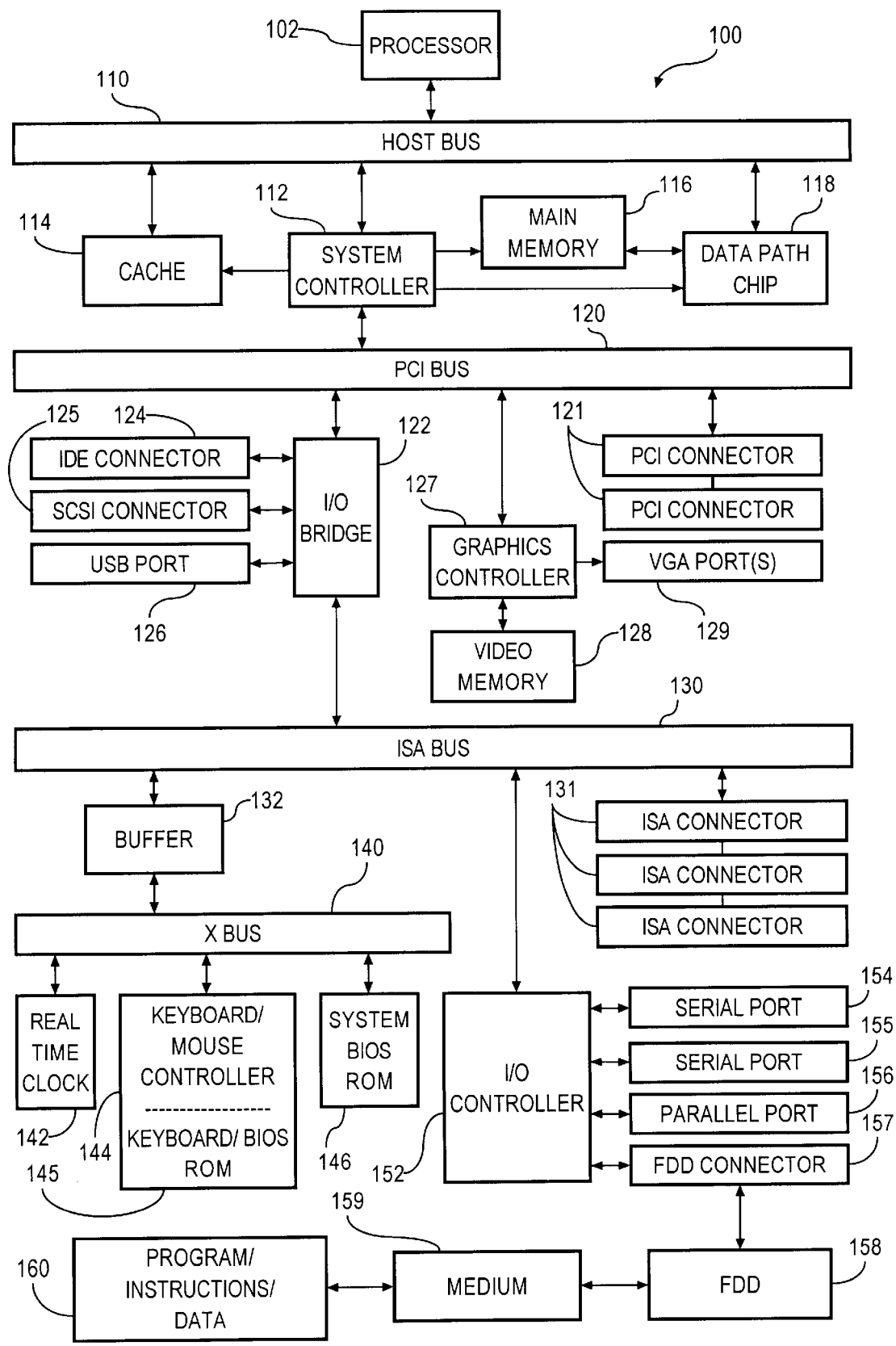
FIG. 1 is a block diagram illustrating a hardware system in accordance with the present invention.

With reference now to the figures, and in particular with reference to FIG. 1, a block diagram of a data processing system 100 in which the present invention may be implemented is illustrated. Data processing system 100 employs a peripheral component interconnect (PCI) local bus architecture. Although the depicted example employs a PCI bus, other bus architectures such as Micro Channel and ISA may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, SCSI host bus adapter 112, and expansion bus interface 114 are connected to PCI local bus 106 by direct component connection. In contrast, audio adapter 116, graphics adapter 118, and audio/video (A/V) adapter 120 are connected to PCI local bus 106 by add-in boards inserted into expansion slots. In the depicted example, audio/visual adapter 120 is a multi-function device containing two agents. Those of ordinary skill in the art will realize that other devices, such as, for example, a dual channel SCSI adapter or a SCSI/Ethernet adapter also may be attached to data processing system 100. Additionally, other numbers of agents other than two may be included in a multifunction device in accordance with a preferred embodiment of the present invention. In the depicted example, the arbitration processes are implemented within the multifunction device.

In one embodiment, PCI bus 106 provides a 32-bit-wide data path that runs at 33 MHz. In another embodiment, PCI bus 106 provides a 64-bit-wide data path that runs at 33 MHz. In yet other embodiments, PCI bus 106 provides 32-bit-wide or 64-bit-wide data paths that run at 33 MHz or higher speeds.

Expansion bus interface 114 provides a connection for a keyboard and mouse adapter 122, modem 124, and additional memory 126. SCSI host bus adapter 112 provides a connection for hard disk drive 128, tape drive 130, and CD-ROM 132 in the depicted example. Typical PCI local bus implementations will support three or four PCI expansion slots or add-in connectors. The depicted example includes four loads on the motherboard and three expansion slots. Those of ordinary skill in the art will appreciate that the hardware in FIG. 1 may vary. For example, other peripheral devices, such as optical disk drives and the like may be used in addition to or in place of the hardware depicted in FIG. 1. The depicted example is not meant to imply architectural limitations with respect to the present invention.

Figure 2:
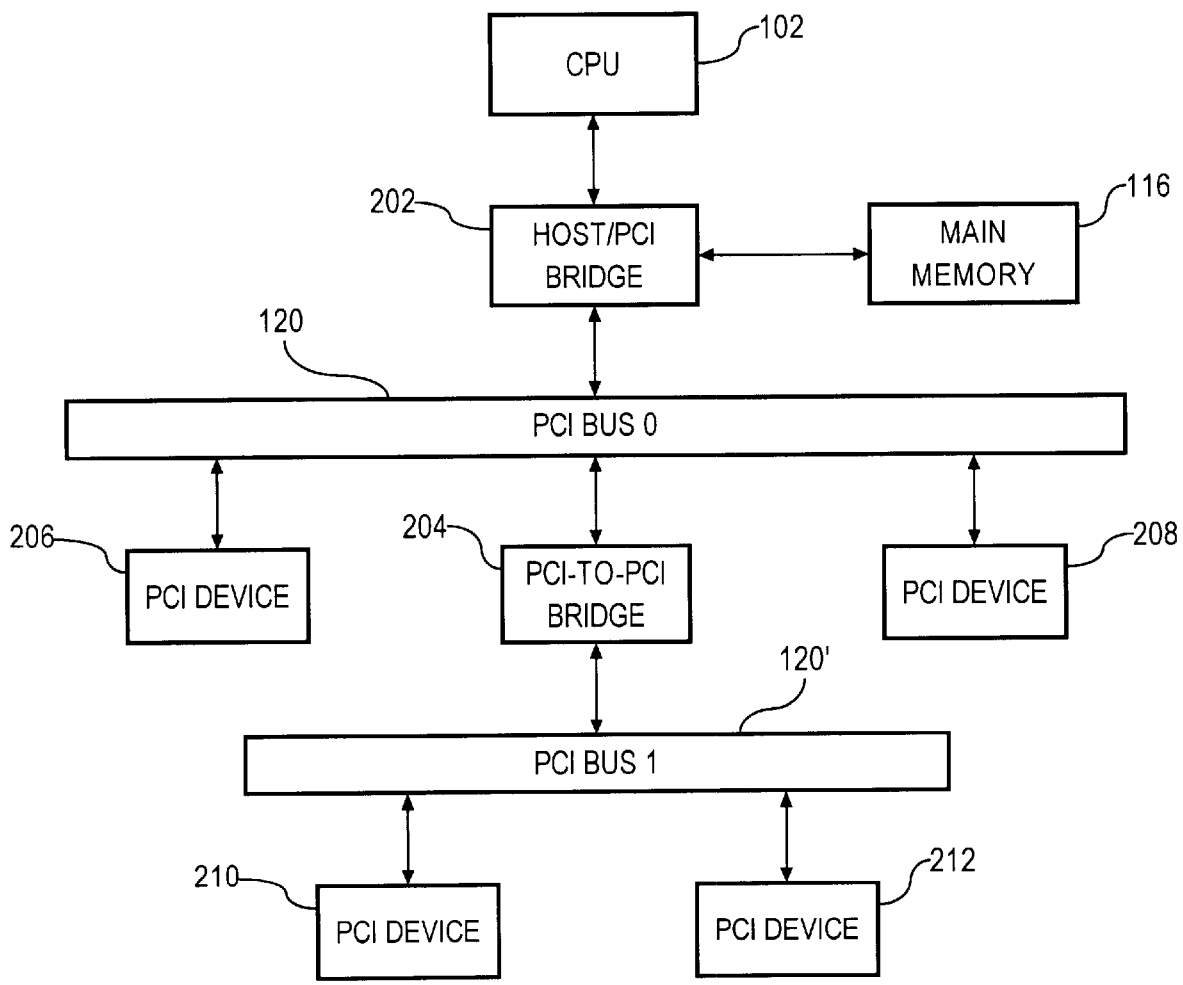
FIG. 2 is a block diagram illustrating an exemplary PCI system operable to embody the present invention.

Referring now to FIG. 2, there is shown a block diagram of a typical PCI system 200. Primary or root PCI bus 206 is connected to host processor 202 by processor-to-PCI bridge or "north bridge" 208, which is incorporated into the system controller. Primary PCI bus 206 may have one or more PCI-to-PCI bridges 234 thereon. Secondary PCI bus 240 is controlled by PCI-to PCI bridge 234. The PCI bus may be populated with devices 236, 238, 242 and 244 requiring accesses to each other and/or main memory 204. The method in accordance with this teaching may be implemented in software using one or more PCI bus exercisers/analyzers which are controlled via PCI. Examples of such exercisers/analyzers are the E2920 series PCI exerciser/analyzer cards available from Agilent Technologies.

Figure 3:
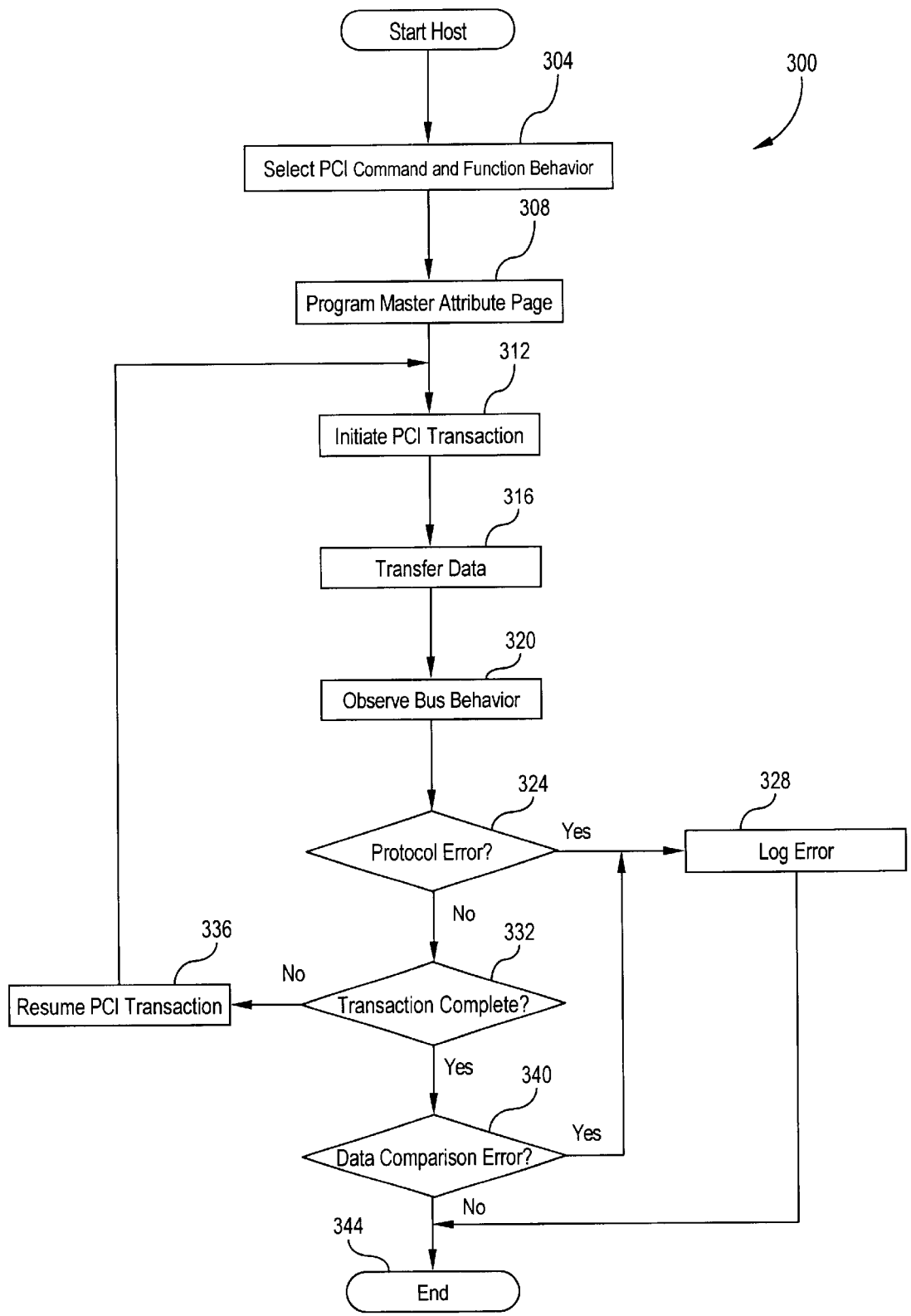
FIG. 3 is a flow diagram illustrating a PCI target verification method according to the present invention.

Referring now to FIG. 3, there is shown a flow chart outlining a method 300 according to a first embodiment of the present invention wherein a PCI device is fully tested for PCI compliance under the PCI specification in target operation. Briefly, a PCI master is programmed to act or behave in a specific way during a PCI transaction, and the target response is observed. The programmed behavior of the master may be correct or incorrect behavior under the PCI protocol. The PCI target device under test is monitored to determine whether the target device correctly abides by the PCI protocol during the transaction.

In step 304, a PCI command and master functional behavior is selected. This includes selecting a PCI command to be executed (e.g., memory read/memory write, memory write and invalidate, I/O write, and so forth) and selecting a functional behavior set. The master functional behavior is determined by selecting the desired master attribute page properties and setting the appropriate PCI configuration space bits (e.g., caching commands, cachelinesize, latency timer, and so forth) for the transaction.

In step 308, the master attribute page is programmed with information selected in step 304. This includes the overall size of the transfer, where and when to insert wait states in the transaction if any, what byte lanes should be enabled/disabled throughout the data phases, 32-bit or 64-bit operation, where and when to initiate a PCI disconnect, how many disconnects to have in the complete transaction, and various other behavioral characteristics specific to PCI master operation. Also, the desired source/destination address alignment for the transaction is set. This allows for full testing on various memory address alignments and cache boundaries. The master attribute page properties are divided into two main sections, address phase attributes and data phase attributes. The master behavior is then controlled by how these various phase attributes are programmed. Possible address phase attributes include trying "Fast Back-to-Back" transactions, Lock, 32/64-bit request, parity and system error reporting (PERR and SERR), and wrong parity signaling. Possible data phase attributes include insertion of wait states, parity and system error reporting (PERR and SERR), and wrong parity signaling.

In step 312 a PCI transaction is initiated, starting with the programmed source/destination address alignment as well as the selected PCI command and any relevant attribute properties specific to the Address/Command phase (i.e., 32-bit or 64-bit operation).

In step 316 data is transferred, and attribute page properties specific to the data phase (i.e., wait states and termination points) are applied during the data transfer. In step 320, the bus is monitored to assure that no PCI protocol specifications (i.e., according to promulgated standards) are violated for the currently executing transfer. In one embodiment, the bus is monitored for PCI protocol violations in accordance with the PCI Local Bus Specification, Revisions 2.1 and/or 2.2, published by PCI Special Interest Group. The aforementioned PCI Local Bus specifications, Revisions 2.1 and 2.2 are incorporated herein by reference in their entireties. Bus observation may be accomplished by snooper logic that monitors output and that preferably records the output in some storage medium. The output may include internal signal levels, values of internal queues of the device or devices under test, conventional output values (e.g., at the I/O pin of the device or devices under test) and so forth. If protocol violations are observed in step 324, then the error is signaled and logged in step 328, and the transaction ends (344). If no protocol violations occur in step 324, the process continues to step 332.

In step 332, it is determined if the transaction under test is complete. If the transaction is not complete, it is resumed in step 336. Since master behavior is ultimately controlled by the attribute page (programmed in step 308), in the case where the transaction is resumed (336), the process returns to step 312 and initiates the programmed sequence, this time starting at a different line in the attribute page.

After the transfer is complete in step 332, a data comparison error check is executed in step 340. For each test, with each varied parameter, there is executed some type of a write followed by a read command (whether the command combination under test is memory write and memory read line or whatever command combination is being used) and a data comparison is performed. Data corruption is checked in step 340 rather than step 320 for a number of reasons. First, at step 320 it is not yet known whether or not the transaction is complete. Additionally, data corruption can occur at times without violating PCI protocol. If no data comparison error is detected in step 340, the process ends (344). If a data miscompare is detected in step 340, the error is logged in step 328 and the process ends at step 344. If desired, the process 300 can be repeated for any additional PCI commands and/or master functional behaviors to be tested. In one embodiment, one or more commands are tested in combination with one or more functional behavior parameters throughout a desired range of variable functional behavior parameter values. In this manner, one or more variable master functional behavior parameters may be incremented throughout a predetermined range of values to provide complete iterative testing of all desired commands and target functional behavior parameter combinations.

Figure 4A:
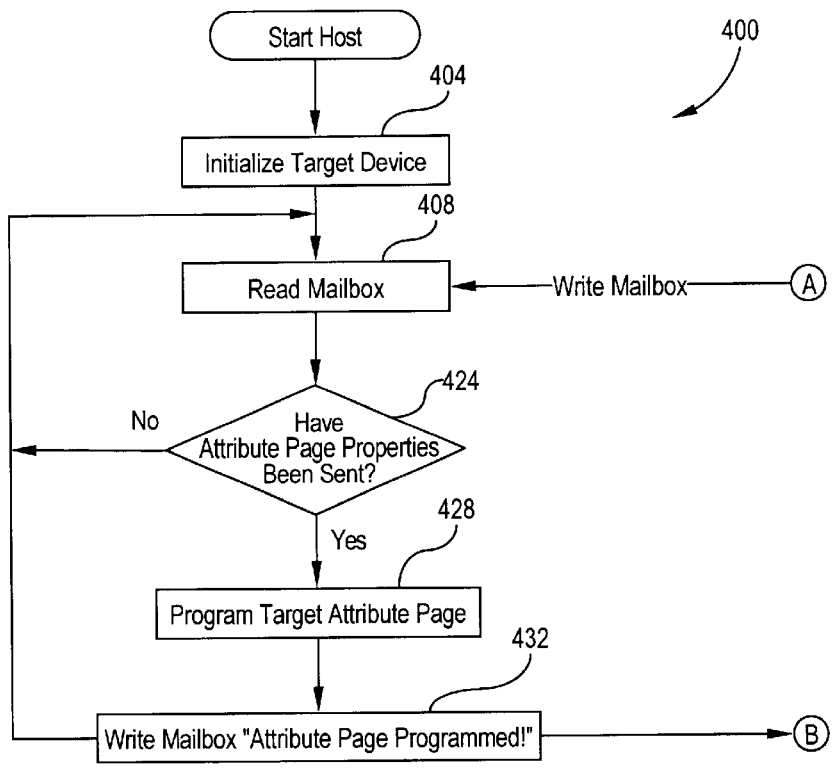
FIG. 4 is a flow diagram illustrating a PCI master verification method according to the present invention.
Figure 4:
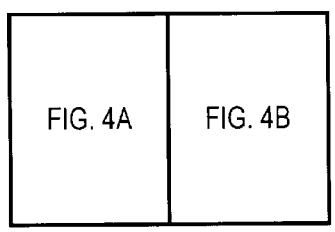

Referring now to FIG. 4, there is shown a flowchart outlining a method for testing a PCI master for compliance under the PCI specification in accordance with the present invention. Briefly, method 400 can be used to test a PCI device in master operation. Through software, the target can be programmed to act or behave a specific way during a PCI transaction, wherein the programmed target behavior may be correct or incorrect behavior in accordance with the PCI specification. The PCI master is then observed in response to the target's programmed behavior to determine if the master device correctly abides by the PCI protocol in response to the target's behavior.

Figure 5:
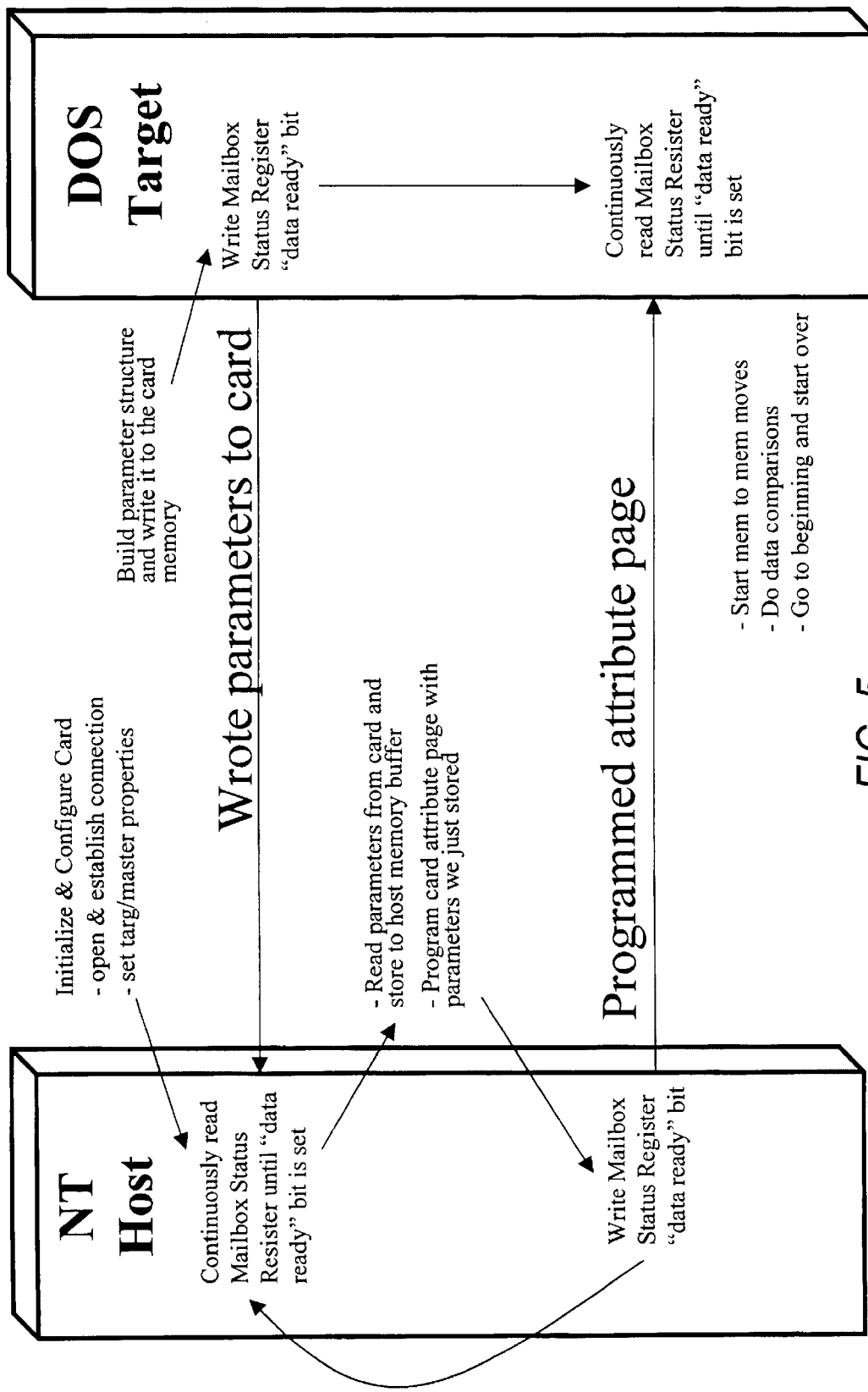
FIG. 5 is a flow diagram illustrating host/target communication employed with the PCI verification methods according to the present invention.

One significant difference between testing target functionality (FIG. 3) and master functionality is that to test master functionality, the target must have knowledge of the initiator's actions and when those actions will occur. The method in accordance with this teaching employs the "Mailbox" register. The "Mailbox" register is a 32-bit register, located in the PCI Configuration space of the exerciser/analyzer apparatus, which is utilized by the process according to the present invention to communicate with the host system. The host system is responsible for programming the exerciser/analyzer with the appropriate target attribute page and, thus, it needs to know when it can program the selected functional behavior into the target attribute page. Similarly, the target system needs to know when it can have the PCI master initiate the transaction and when it must send the selected functional behavior to be programmed. The host/target communication is illustrated in greater detail in FIG. 5.

Referring again to FIG. 4, the steps are generally numbered in the order of execution. Referring now to the host side (FIG. 4A) of process 400, the target device is initialized in step 404. This involves establishing a connection with the target system and initializing the exerciser/analyzer to act as a PCI target. This process includes setting up card memory buffers, attribute page properties, address decoder values, and other power-on routines for initialization.

After initializing the target (404), the Mailbox status register is read in step 408. In step 424, it is determined if the attribute page properties have been sent. If not, the process returns to step 408 which is repeated until the desired target functional behavior has been sent. At this point the target code should be executed.

After determining that the attribute page properties have been sent in step 424, the target attribute page is programmed in step 428 with information selected and sent from the target system (416). This information includes the overall size of the transfer, where and when to insert wait states in the transaction if any, what byte lanes should be enabled/disabled throughout the data phases, 32-bit or 64-bit operation, where and when to initiate a PCI disconnect or PCI abort, how many disconnects/aborts to have throughout the complete transaction, and other behavioral characteristics specific to PCI target operation. Also, the desired source/destination address alignment is set for the transaction that is intended to be initiated. This allows for full testing on various memory address alignments and cache boundaries.

Similar to the master attribute page, the target attribute page properties are also divided into two main sections, address phase attributes and data phase attributes. The target behavior is then controlled by how these various phase attributes are programmed. Exemplary address phase attributes include 32/64-bit acknowledge and system error signaling (SERR). Exemplary data phase attributes include insertion of wait states into the transaction, various means of PCI termination (e.g., disconnects, Retry, Abort), and also parity and system errors (i.e., by inducing bad parity on a particular data transfer).

After programming the target attribute page, the Mailbox status register is written in step 432 with the appropriate bit to signal to the target system that the attribute page has been programmed and the transaction can start. The process then loops to step 408 to wait for the next attribute set to be sent.

Figure 4B:
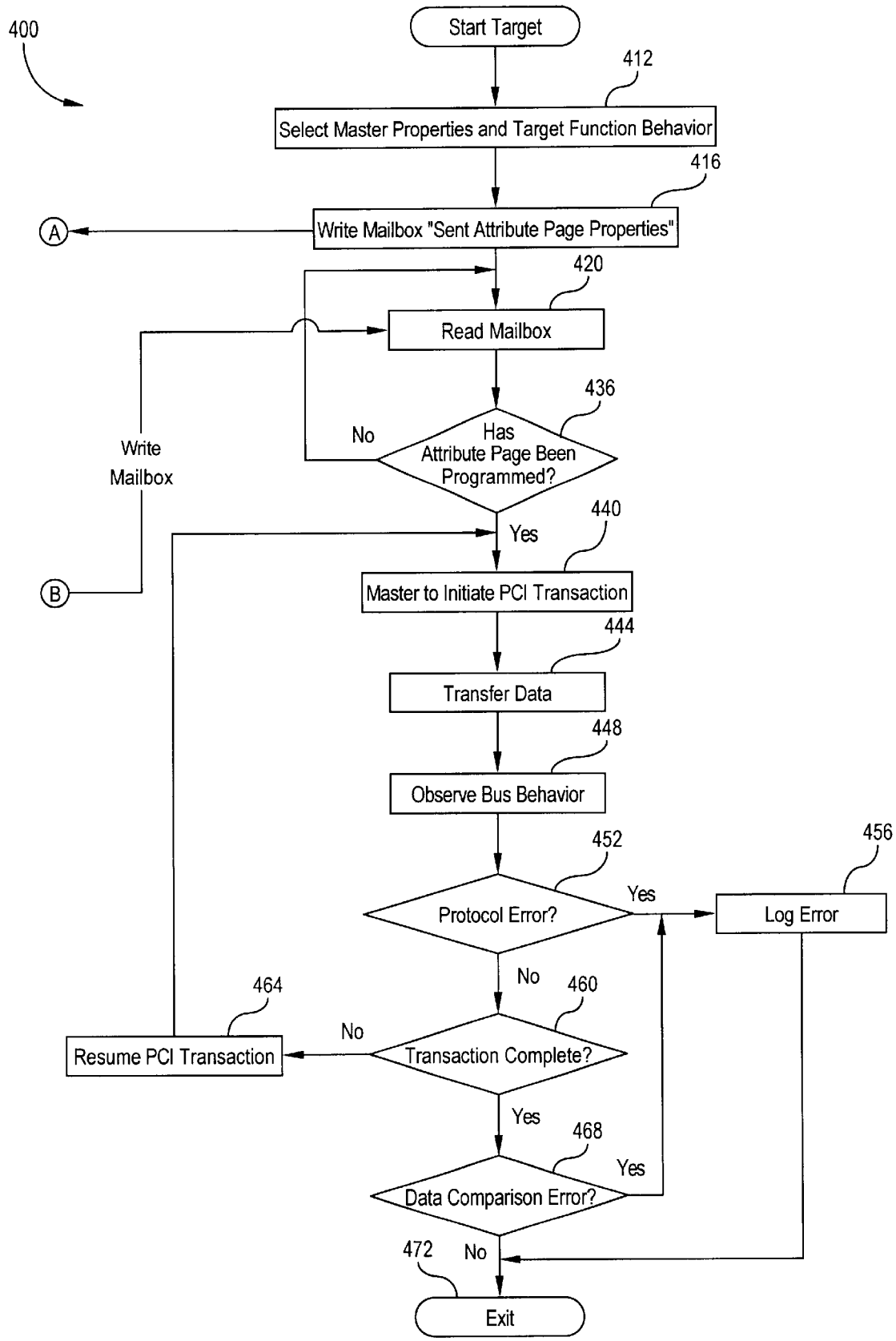

Referring now to the target side of process 400 (FIG. 4B), the master properties and target functional behavior are set in step 412. This involves setting the appropriate master configuration space bits (e.g., caching commands, cache line size, latency timer, and so forth) for the transaction. This also involves setup of the master to execute a memory write/memory read sequence to/from the target device. Next, the desired source/destination address alignment for the transaction that will be initiated is set. This allows for full testing on various memory address alignments and cache boundaries. Finally, this step also includes selecting the functional behavior set. In general, this includes selecting the desired target attribute page properties for the transaction as described above (see step 428).

The process then proceeds to step 416 wherein the Mailbox status register is written with the appropriate bit to signal to the host system that the functional behavior properties have been selected and sent.

The process then proceeds to step 420, wherein the Mailbox status register is read, and step 436 wherein it is determined if the host has programmed the target attribute page. Steps 420 and 436 are repeated until it is determined that the attribute page has been programmed and whether the host is ready to start the transaction.

Once it is determined in step 436 that the attribute page has been programmed, the process proceeds to step 440 in which the master device initiates the transaction by selecting the target device and placing the appropriate write command (memory write or memory write and invalidate) on the bus. The selected source/destination address alignment for the transaction will also be used at this point. At this point, the target attribute page properties specific to address phase (ACK64) are applied when the target claims the transaction.

After initiating the transaction in step 440, data is transferred in step 444 and the target attribute page properties specific to the data phase (e.g., target wait states, disconnect points, retries, aborts, 64-bit to 32-bit downshifting, and so forth) are applied during the data transfer. In step 448, bus behavior is observed for the currently executing transfer.

Specifically, the bus is monitored to assure that no PCI protocol specifications are violated. In one embodiment, the bus is monitored for PCI protocol violations in accordance with the PCI Local Bus Specification, Revisions 2.1 and/or 2.2, published by PCI Special Interest Group. If protocol violations are observed (452) the error is signaled and logged in step 456 and the transaction ends (472). If no protocol violations occur in step 452, the process proceeds to step 460.

In step 460, it is determined whether the transaction is complete. If the transaction is not complete, the process continues to step 464 and the PCI transaction is resumed. Since target behavior is ultimately controlled by the attribute page (programmed in step 428), in the case when the transaction is resumed, the process points back to step 440 and the master initiates the programmed sequence. The programmed target behavior is maintained in the attribute page and is started up at the appropriate point following the resumed transaction. Also, because the target behavior is controlled, it is known when a disconnect or abort is going to be issued and thus, it is known where to start in the attribute page.

Once the transfer is complete (460), data corruption is checked in step 468. A write/read combination is required to perform a data comparison check at the end of transaction. Data corruption is not checked in step 448 because it is not yet known if the transaction is complete or not and, furthermore, data corruption can occur at times without violating PCI protocol. If a data miscompare is detected in step 468, the error is logged in step 456 and the process ends at step 472. If desired, the process 400 may then be repeated for any additional PCI commands and/or master functional behaviors to be tested. In one embodiment, one or more commands are tested in combination with one or more functional behavior parameters throughout a desired range of variable functional behavior parameter values. In this manner, one or more variable target functional behavior parameters may be incremented throughout a predetermined range of values to provide complete iterative testing of all desired commands and master functional behavior parameter combinations.

EXAMPLE

Pseudo-code illustrating the testing methodology according to the present invention wherein all possible protocol combinations (e.g., for the latency timer, burst size, disconnects) are tested is given in Table 1.

example in a hard disk drive or in a removable memory such as an optical disk for utilization in a DVD-ROM or CD-ROM drive, a magnetic media for utilization in a magnetic media drive, a magneto-optical disk for utilization in a magneto-optical drive, a floptical disk for utilization in a floptical drive, or a personal computer memory card for utilization in a personal computer card slot. Further, the set of instructions can be stored in the memory of another computer and transmitted over a local area network or a wide area network, such as the Internet, when desired by the user. Additionally, the instructions may be transmitted over a network in the form of an applet that is interpreted after transmission to the computer system rather than prior to transmission. One skilled in the art would appreciate that the physical storage of the sets of instructions or applets physically changes the medium upon which it is stored electrically, magnetically, chemically, physically, or optically so that the medium carries computer readable information.

The description above should not be construed as limiting the scope of the invention, but as merely providing illustrations to some of the presently preferred embodiments of this invention. In light of the above description and examples, various other modifications and variations will now become apparent to those skilled in the art without departing from the spirit and scope of the present invention as defined by the appended claims. Accordingly, the scope of the invention should be determined solely by the appended claims and their legal equivalents.

What is claimed is:

1. A method for the automatic testing of a PCI bus system in an information handling system, comprising the steps of:
   (a) selecting a PCI command to be tested;
   (b) programming a PCI master to exhibit predetermined functional behavior during a PCI transaction;
   (c) asserting said PCI command to initiate a PCI transaction, said transaction comprising transfer of data over said PCI bus;
   (d) transferring at least a portion of said data;
   (e) monitoring and recording the behavior of said PCI bus system;
   (f) determining whether a PCI protocol error has occurred;
   (g) if an error has occurred in step (f), logging said error and halting execution;
   (h) repeating steps (c) through (g) until it is determined that an error has occurred in step (t) or until said PCI transaction is complete; and

TABLE 1

```
for (i=1; i<latency_timer_max; i++) // the latency timer is changed by the host code
    for (j=1; j<burst_size_max; j++) //test all burst sizes
        for (k=1; k<disconnect_max; k++) //walk all possible PCI disconnects through burst size
```

Although the invention has been described with a certain degree of particularity, it should be recognized that elements thereof may be altered by persons skilled in the art without departing from the spirit and scope of the invention. One of the embodiments of the invention can be implemented as sets of instructions resident in the main memory 104 of one or more computer systems configured generally as described in FIG. 1. Until required by the computer system, the set of instructions may be stored in another computer readable memory such as the auxiliary memory of FIG. 1, for (i) if said PCI transaction is complete:
   (j) writing data from a first memory location to a second memory location;
   (k) reading data from said second memory location; and
   (l) comparing data from said first memory location to data from said second memory location.

2. A method according to claim 1, wherein said PCI command comprises a memory read line command.

3. A method according to claim 1, wherein said PCI command comprises a memory read multiple command.

4. A method according to claim 1, wherein said PCI command comprises an I/O read command.

5. A method according to claim 1, wherein said PCI command comprises an I/O write command.

6. A method according to claim 1, wherein said PCI command comprises a configuration read command.

7. A method according to claim 1, wherein said PCI command comprises a configuration write command.

8. A method according to claim 1, wherein said predetermined functional behavior is in violation of PCI protocol.

9. A method according to claim 1, wherein said predetermined functional behavior is not in violation of PCI protocol.

10. A method for the automatic testing of a PCI bus system in an information handling system, comprising the steps of:
  (a) initializing a PCI target device, said target device programmable to exhibit predetermined functional behavior during a PCI transaction;
  (b) programming said PCI target device to exhibit said predetermined functional behavior during said PCI transaction;
  (c) providing a PCI master device, said PCI master device comprising configuration address space, said configuration address space programmable to configure said PCI master device;
  (d) programming said configuration address space to provide a first set of PCI bus utilization properties for said PCI master device;
  (e) after said PCI target device is programmed to exhibit said predetermined functional behavior, initiating said PCI transaction, said transaction comprising transfer of data over said PCI bus;
  (f) transferring at least a portion of said data;
  (g) monitoring and recording the behavior of said PCI bus system;
  (h) determining whether a PCI protocol error has occurred;
  (i) if an error has occurred in step (h), logging said error and halting execution;
  (j) repeating steps (e) through (i) until it is determined that an error has occurred in step (h) or until said PCI transaction is complete; and
  (k) if said PCI transaction is complete:
    (l) writing data from a first memory location to a second memory location;
    (m) reading data from said second memory location; and
    (n) comparing data from said first memory location to data from said second memory location.

11. A method according to claim 10, wherein said PCI command comprises a memory read line command.

12. A method according to claim 10, wherein said PCI command comprises a memory read multiple command.

13. A method according to claim 10, wherein said PCI command comprises an I/O read command.

14. A method according to claim 10, wherein said PCI command comprises an I/O write command.

15. A method according to claim 10, wherein said PCI command comprises a configuration read command.

16. A method according to claim 10, wherein said PCI command comprises a configuration write command.

17. A method according to claim 10, wherein said predetermined functional behavior is in violation of PCI protocol.

18. A method according to claim 10, wherein said predetermined functional behavior is not in violation of PCI protocol.

19. In an information handling system, an apparatus for the automatic testing and verification of a PCI bus system, comprising:
  (a) means for selecting a PCI command to be tested;
  (b) means for programming a PCI master to exhibit predetermined functional behavior during a PCI transaction;
  (c) means for asserting said PCI command to initiate a PCI transaction, said transaction comprising transfer of data over said PCI bus;
  (d) means for transferring at least a portion of said data;
  (e) means for monitoring and recording the behavior of said PCI bus system;
  (f) means for determining whether a PCI protocol error has occurred;
  (g) means for logging an error and halting execution if an error has occurred in step (f);
  (h) means for repeating steps (c) through (g) until it is determined that an error has occurred in step (f) or until said PCI transaction is complete; and
  (i) if said PCI transaction is complete:
    (j) means for writing data from a first memory location to a second memory location;
    (k) means for reading data from said second memory location; and
    (l) means for comparing data from said first memory location to data from said second memory location.

20. An apparatus according to claim 19, wherein said PCI command comprises a memory read line command.

21. An apparatus according to claim 19, wherein said PCI command comprises a memory read multiple command.

22. An apparatus according to claim 19, wherein said PCI command comprises an I/O read command.

23. An apparatus according to claim 19, wherein said PCI command comprises an I/O write command.

24. An apparatus according to claim 19, wherein said PCI command comprises a configuration read command.

25. An apparatus according to claim 19, wherein said PCI command comprises a configuration write command.

26. An apparatus according to claim 19, wherein said predetermined functional behavior is in violation of PCI protocol.

27. An apparatus according to claim 19, wherein said predetermined functional behavior is not in violation of PCI protocol.

28. In an information handling system, an apparatus for the automatic testing and verification of a PCI bus system, comprising:
  (a) means for initializing a PCI target device, said target device programmable to exhibit predetermined functional behavior during a PCI transaction;
  (b) means for programming said PCI target device to exhibit said predetermined functional behavior during said PCI transaction;
  (c) means for providing a PCI master device, said PCI master device comprising configuration address space, said configuration address space programmable to configure said PCI master device;
  (d) means for programming said configuration address space to provide a first set of PCI bus utilization properties for said PCI master device;
  (e) means for initiating said PCI transaction after said PCI target device is programmed to exhibit said predetermined functional behavior, said transaction comprising transfer of data over said PCI bus;

(f) means for transferring at least a portion of said data;

(g) means for monitoring and recording the behavior of said PCI bus system;

(h) means for determining whether a PCI protocol error has occurred;

(i) means for logging an error and halting execution if an error occurs in step (h);

(j) means for repeating steps (e) through (i) until it is determined that an error has occurred in step (h) or until said PCI transaction is complete; and (k) if said PCI transaction is complete:
  (l) means for writing data from a first memory location to a second memory location;
  (m) means for reading data from said second memory location; and
  (n) means for comparing data from said first memory location to data from said second memory location.

29. An apparatus according to claim 28, wherein said PCI command comprises a memory read line command.

30. An apparatus according to claim 28, wherein said PCI command comprises a memory read multiple command.

31. An apparatus according to claim 28, wherein said PCI command comprises an I/O read command.

32. An apparatus according to claim 28, wherein said PCI command comprises an I/O write command.

33. An apparatus according to claim 28, wherein said PCI command comprises a configuration read command.

34. An apparatus according to claim 28, wherein said PCI command comprises a configuration write command.

35. An apparatus according to claim 28, wherein said predetermined functional behavior is in violation of PCI protocol.

36. An apparatus according to claim 28, wherein said predetermined functional behavior is not in violation of PCI protocol.

37. In an information handling system, an apparatus for the automatic testing and verification of a PCI bus system, comprising:

(a) control logic for selecting a PCI command to be tested;

(b) control logic for programming a PCI master to exhibit predetermined functional behavior during a PCI transaction;

(c) control logic for asserting said PCI command to initiate a PCI transaction, said transaction comprising transfer of data over said PCI bus;

(d) control logic for transferring at least a portion of said data;

(e) control logic for monitoring and recording the behavior of said PCI bus system;

(f) control logic for determining whether a PCI protocol error has occurred;

(g) control logic for logging said error and halting execution if an error has occurred in step (f);

(h) control logic for repeating steps (c) through (g) until it is determined that an error has occurred in step (f) or until said PCI transaction is complete; and (i) if said PCI transaction is complete:
  (j) control logic for writing data from a first memory location to a second memory location;
  (k) control logic for reading data from said second memory location; and
  (l) control logic for comparing data from said first memory location to data from said second memory location.

38. In an information handling system, an apparatus for the automatic testing and verification of a PCI bus system, comprising:

(a) control logic for initializing a PCI target device, said target device programmable to exhibit predetermined functional behavior during a PCI transaction;

(b) control logic for programming said PCI target device to exhibit said predetermined functional behavior during said PCI transaction;

(c) control logic for providing a PCI master device, said PCI master device comprising configuration address space, said configuration address space programmable to configure said PCI master device;

(d) control logic for programming said configuration address space to provide a first set of PCI bus utilization properties for said PCI master device;

(e) control logic for initiating said PCI transaction after said PCI target device is programmed to exhibit said predetermined functional behavior, said transaction comprising transfer of data over said PCI bus;

(f) control logic for transferring at least a portion of said data;

(g) control logic for monitoring and recording the behavior of said PCI bus system;

(h) control logic for determining whether a PCI protocol error has occurred;

(i) control logic for logging an error and halting execution if an error occurs in step (h);

(j) control logic for repeating steps (e) through (i) until it is determined that an error has occurred in step (h) or until said PCI transaction is complete; and (k) if said PCI transaction is complete:
  (l) control logic for writing data from a first memory location to a second memory location;
  (m) control logic for reading data from said second memory location; and
  (n) control logic for comparing data from said first memory location to data from said second memory location.

39. A program storage device readable by a machine, tangibly embodying a program of instructions executable by the machine to perform method steps for testing and verification of a PCI bus system in an information handling system, said method steps comprising:

(a) selecting a PCI command to be tested;

(b) programming a PCI master to exhibit predetermined functional behavior during a PCI transaction;

(c) asserting said PCI command to initiate a PCI transaction, said transaction comprising transfer of data over said PCI bus;

(d) transferring at least a portion of said data;

(e) monitoring and recording the behavior of said PCI bus system;

(f) determining whether a PCI protocol error has occurred;

(g) if an error has occurred in step (f), logging said error and halting execution;

(h) repeating steps (c) through (g) until it is determined that an error has occurred in step (f) or until said PCI transaction is complete; and (i) if said PCI transaction is complete:
  (j) writing data from a first memory location to a second memory location;
  (k) reading data from said second memory location; and
  (l) comparing data from said first memory location to data from said second memory location.

40. A program storage device readable by a machine, tangibly embodying a program of instructions executable by the machine to perform method steps for testing and verification of a PCI bus system in an information handling system, said method steps comprising:

(a) initializing a PCI target device, said target device programmable to exhibit predetermined functional behavior during a PCI transaction;

(b) programming said PCI target device to exhibit said predetermined functional behavior during said PCI transaction;

(c) providing a PCI master device, said PCI master device comprising configuration address space, said configuration address space programmable to configure said PCI master device;

(d) programming said configuration address space to provide a first set of PCI bus utilization properties for said PCI master device;

(e) after said PCI target device is programmed to exhibit said predetermined functional behavior, initiating said PCI transaction, said transaction comprising transfer of data over said PCI bus;

(f) transferring at least a portion of said data;

(g) monitoring and recording the behavior of said PCI bus system;

(h) determining whether a PCI protocol error has occurred;

(i) if an error has occurred in step (h), logging said error and halting execution;

(j) repeating steps (e) through (i) until it is determined that an error has occurred in step (h) or until said PCI transaction is complete; and (k) if said PCI transaction is complete:

(l) writing data from a first memory location to a second memory location;

(m) reading data from said second memory location; and (n) comparing data from said first memory location to data from said second memory location.

* * * * *